(12) United States Patent
Chen (10) Patent No.: US 9,702,335 B2
(45) Date of Patent: Jul. 11, 2017

(54) HYDRAULIC WAVE ENERGY CONVERTER

(71) Applicant: Jiashan Chen, Hunan (CN)

(72) Inventor: Jiashan Chen, Hunan (CN)

( * ) Notice: Subject to any disclaimer, the term of this patent is extended or adjusted under 35 U.S.C. 154(b) by 56 days.

(21) Appl. No.: 14/908,120

(22) PCT Filed: Jul. 25, 2014

(86) PCT No.: PCT/CN2014/082978
§ 371 (c)(1),
(2) Date: Jan. 27, 2016

(87) PCT Pub. No.: WO2015/014241
PCT Pub. Date: Feb. 5, 2015

(65) Prior Publication Data
US 2016/0138557 A1    May 19, 2016

(30) Foreign Application Priority Data
Jul. 29, 2013  (CN) ..................... 2013 2 0453884 U (51) Int. Cl.
*F03B 13/18*    (2006.01)

(52) U.S. Cl.
CPC ............ *F03B 13/189* (2013.01); *F03B 13/18* (2013.01); *F03B 13/187* (2013.01); *F05B 2240/95* (2013.01); *F05B 2240/97* (2013.01); *F05B 2280/1071* (2013.01); *F05B 2280/10304* (2013.01); *F05B 2280/4006* (2013.01); *Y02E 10/38* (2013.01)

(58) Field of Classification Search
CPC .......... F03B 13/18; F03B 13/20; F03B 13/22; F05B 2240/95; F05B 2240/97; F05B 2280/1071; F05B 2280/4006; F05N 2280/10304; Y02E 10/38
USPC .......................................... 60/497, 499, 505
See application file for complete search history.

(56) References Cited

U.S. PATENT DOCUMENTS

| 2010/0034670 | A1* | 2/2010 | Smith | ................... F03B 13/187 417/53 |
| 2011/0175359 | A1* | 7/2011 | Patten | ..................... F03B 13/20 290/53 |
| 2013/0200626 | A1* | 8/2013 | Sidenmark | .......... F03B 13/1885 290/53 |
| 2013/0205769 | A1* | 8/2013 | Fievez | ................... B63B 22/00 60/501 |

* cited by examiner

*Primary Examiner* — Jorge Leon, Jr.

(57) ABSTRACT

A hydraulic wave energy converter, for converting wave energy into high-pressure water energy, includes a rectangular upper floating body (1) floating on water surface, a cylindrical housing-shaped lower floating body (2) under water, a first cable (3), a second cable (4), a hanging rod (5), a ball hinged hook (6), a sea floor anchor pile (7), and other mooring facilities. A plurality of water hydraulic cylinders (8) are vertically fixed at two wider sides of the upper floating body (1) and are reliably connected with the lower floating body (2) through piston heads (27), piston rods (28) and piston rod seats (29). The hydraulic wave energy converter can convert the vertical component and the horizontal component of the wave motion into high-pressure water energy for impacting a hydraulic generator set to generate power, and is lower in cost, simple in maintenance and high in wave energy conversion efficiency.

3 Claims, 7 Drawing Sheets

HYDRAULIC WAVE ENERGY CONVERTER

CROSS REFERENCE OF RELATED APPLICATION

This is a U.S. National Stage under 35 U.S.C 371 of the International Application PCT/CN2014/082978, filed Jul. 25, 2014, which claims priority under 35 U.S.C. 119(a-d) to CN 201320453884.7, filed Jul. 29, 2013.

BACKGROUND OF THE PRESENT INVENTION

Field of Invention

The present invention relates to the field of renewable energy, and more particularly to an apparatus which is capable of converting ocean wave energy into high-pressure hydropower so as to drive the water turbine generator to generate electricity.

Description of Related Arts

In order to reduce carbon emissions for fighting global warming, some products and patents which utilize ocean wave energy to generate electricity appear, such as the "sea snake" device in Britain. The "sea snake" device comprises three metallic cylinders, each of which having a length of 40 M and a diameter of 3 M, a hydraulic machinery is installed within the metallic cylinders, the metallic cylinders fluctuate in waves for driving the hydraulic machinery to generate electricity, and the maximum generation power is 750 Kw. However, the "sea snake" device has disadvantages of complex structure, poor maintenance and low wave energy utilization efficiency. The "floating pontoon wave energy electricity generating equipment" (disclosed by Chinese Patent No. 85100366.4) comprises a cylinder floating body on the surface of the water, a piston floating body under the water and mooring device, wherein under the effect of waves, the cylinder floating body moves relatively to the piston floating body for generating electricity. It is required that under the effect of waves (non-sinusoidal waves), the cylinder floating body and the piston floating body periodically swing along with waves, and however, in fact, the piston floating body rotates by taking two mooring points under the piston floating body as the rotating axis, so as to drive the cylinder to similarly rotate in a large angle. Therefore, in spite that the draught of the cylinder is increased and the buoyancy thereof is also increased, acting components are small, namely, generating capacities are small; and simultaneously, due to the large angle rotation of the cylinder floating body, the buoyancy thereof is increased much, so that while weakening wave forces, the cylinder floating body immediately returns back to the vertical position under the effect of buoyancy, namely the cylinder floating body moves asynchronously with the wave period. In addition, the diameter of the cylinder cover of the pressure cylinder on the cylinder floating body is the same as the inner diameter of the pressure cylinder, in such a manner that the size of the inlet valve and the outlet valve which are arranged on the cylinder cover is small, so that water absorption and water drainage are not free. Both the inlet valve and the outlet valve have improper structures, so that the pressure cylinder is unable to maintain air tightness and water tightness. Moreover, the frame-type guiding rail is easy to be corroded and damaged, so that the movement of the cylinder floating body is blocked and the piston rod is deformed.

SUMMARY OF THE PRESENT INVENTION

An object of the present invention is to provide a device which is capable of reliably and highly effectively converting wave forces into water pressure, wherein the high-pressure water is adapted for impacting the pelton turbine to generate electricity.

A technical solution of the present invention is to provide a hydraulic wave energy converter, which comprises an upper floating body 1, a lower floating body 2, a first cable 3, a second cable 4, a hanging rod 5, a ball hinged hook 6 and a sea floor anchor pile 7, wherein the upper floating body 1 is a rectangular hollow concrete building, at least two hydraulic cylinders 8 are respectively vertically and equidistantly fixed to two wider sides of the upper floating body 1, a flared joint 9 is fixed to an upper end of every hydraulic cylinder 8, a flared joint 10 is fixed to a lower end of every hydraulic cylinder 8, a cylinder cover 11 is located at a wider end of the flared joint 9, a water outlet 12 is provided at a middle of the cylinder cover 11, two water inlets 13 are respectively provided at two sides of the cylinder cover 11, a cylinder cover 14 is located at a wider end of the flared joint 10, a bearing 15 is mounted in a circular hole at a middle of the cylinder cover 14, a water outlet 16 and two water inlets 17 are respectively provided at a periphery of the cylinder cover 14, the water outlet 12 is connected with a water discharging valve chamber 18 and a water discharging pipe 19, the water outlet 16 is connected with the water discharging valve chamber 18 and a water discharging pipe 20, both the two water inlets 13 and the two water inlets 17 are connected with a water inflowing valve chamber 21 and a water inflowing pipe 22, a water discharging valve 23 and a spring 24 are located within the water discharging valve chamber 18, a water inflowing valve 25 and a spring 26 are located within the water inflowing valve chamber 21, a piston head 27 slidably fitted with a cylinder wall and a piston rod 28 connected with the piston head 27 are located within the hydraulic cylinder 8, a proportion of the upper floating body 1 with every hydraulic cylinder 8 is 0.5, the lower floating body 2 is a sealing cylindrical housing, a piston rod seat 29 is located at an upper portion of the lower floating body 2, an amount and a position of the piston rod seat 29 are corresponding to those of the piston rod 28, a first pair of earrings 30 and 31 are located at one side of the lower floating body 2, a second pair of earrings 32 and 33 are located at the other side of the lower floating body 2, the first cable 3 is fixedly connected with the first pair of earrings 30 and 31 via the hanging rod 5, the second cable 4 is fixedly connected with the second pair of earrings 32 and 33 via the hanging rod 5, the hanging rod 5 is connected with the sea floor anchor pile 7 via the ball hinged hook 6.

The working principle and the working progress of the present invention are described in detail as follows.

Figure 1:
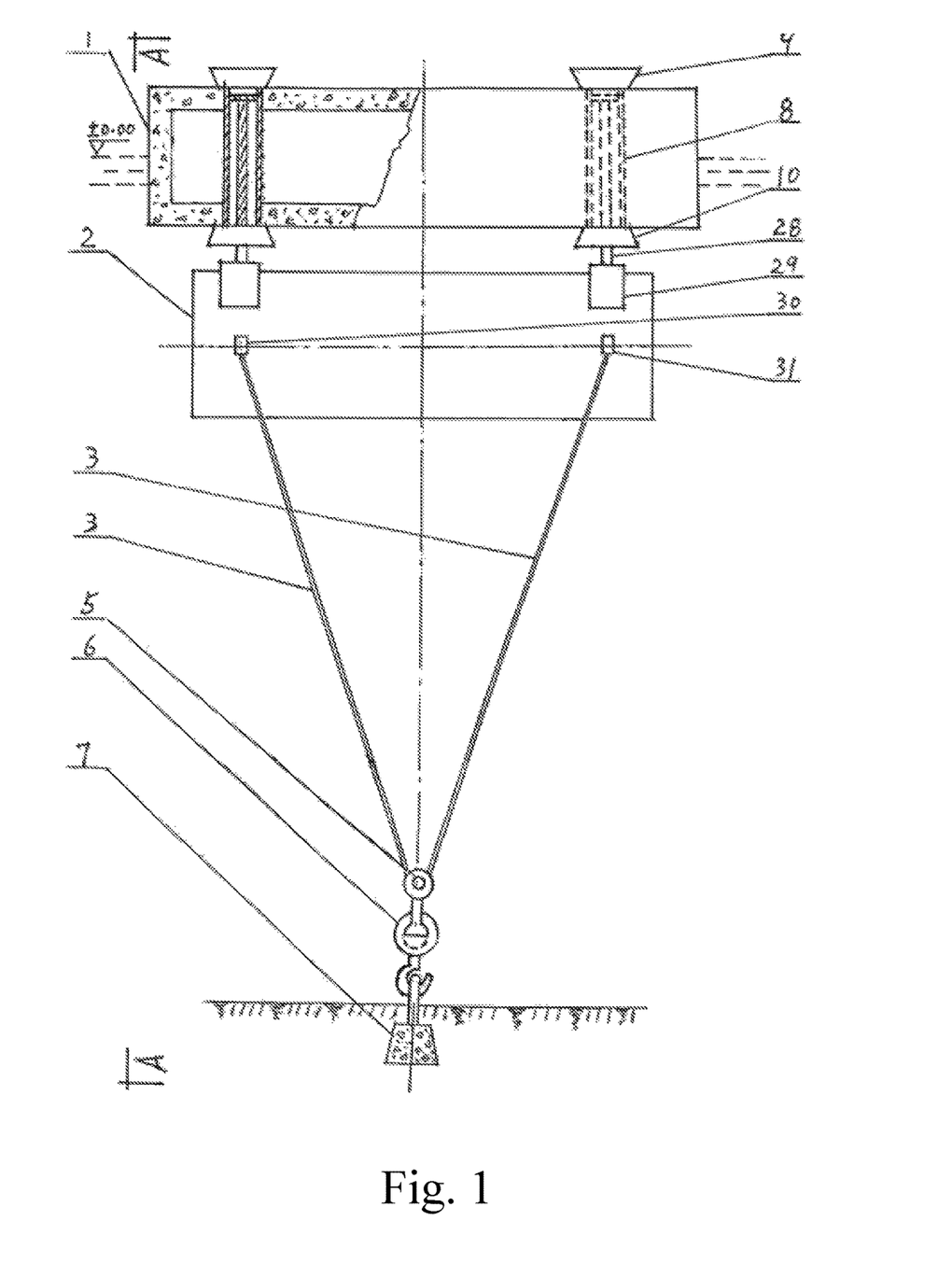
FIG. 1 is a front view of a hydraulic wave energy converter of the present invention.
Figure 2:
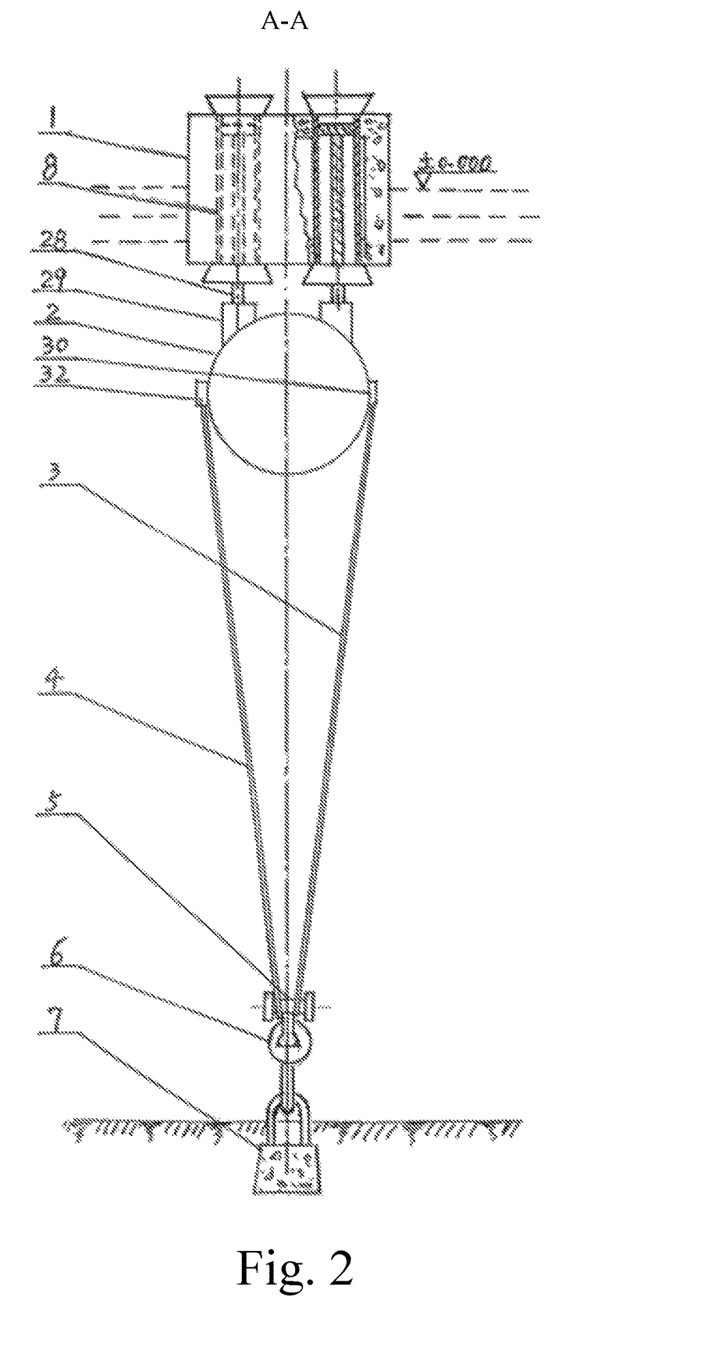
FIG. 2 is A-directional view of the front view of a hydraulic wave energy converter of the present invention.
Figure 3:
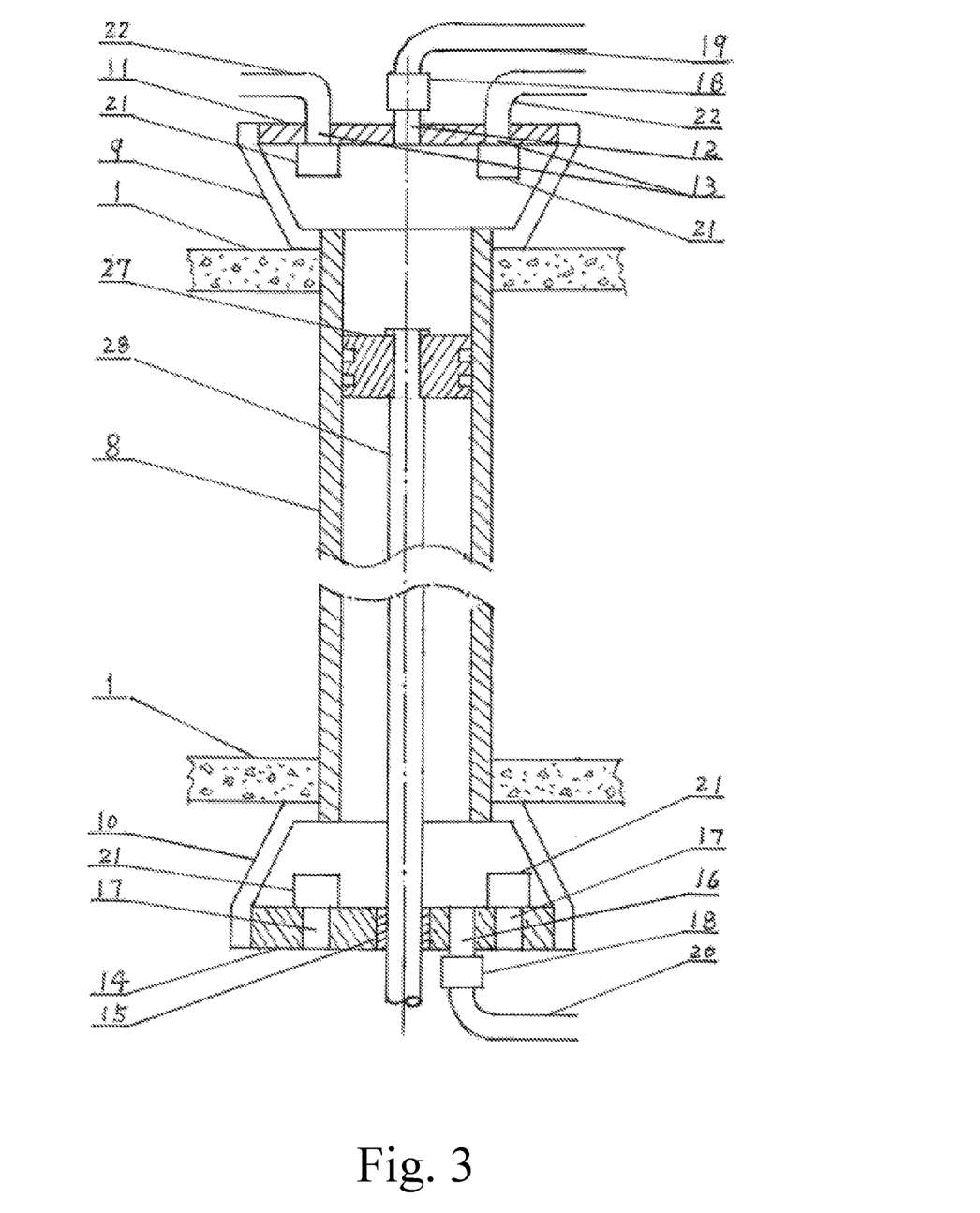
FIG. 3 is a forward sectional view of a hydraulic cylinder 8.
Figure 4:
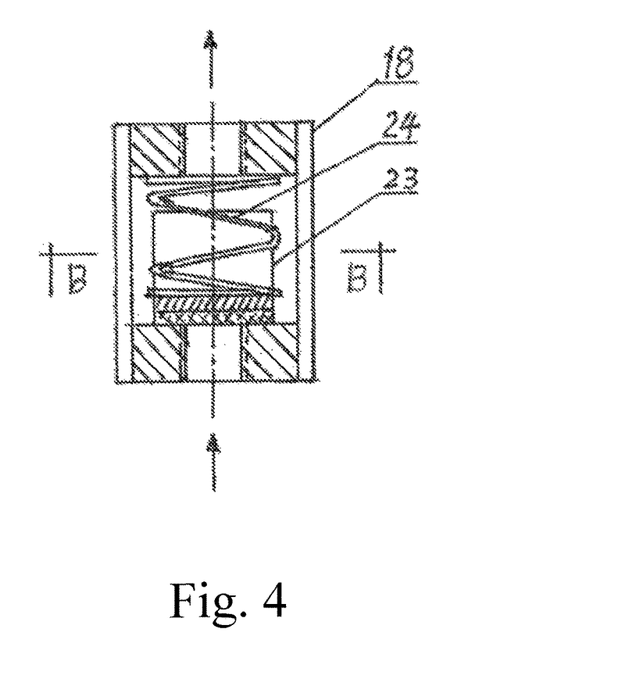
FIG. 4 is a forward sectional view of a water discharging valve chamber 18.
Figure 5:
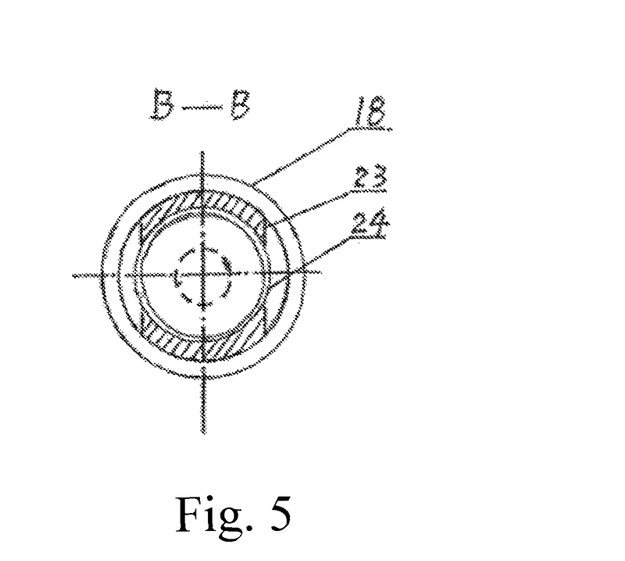
FIG. 5 is a B-directional view of the forward sectional view of the water discharging valve chamber 18.
Figure 6:
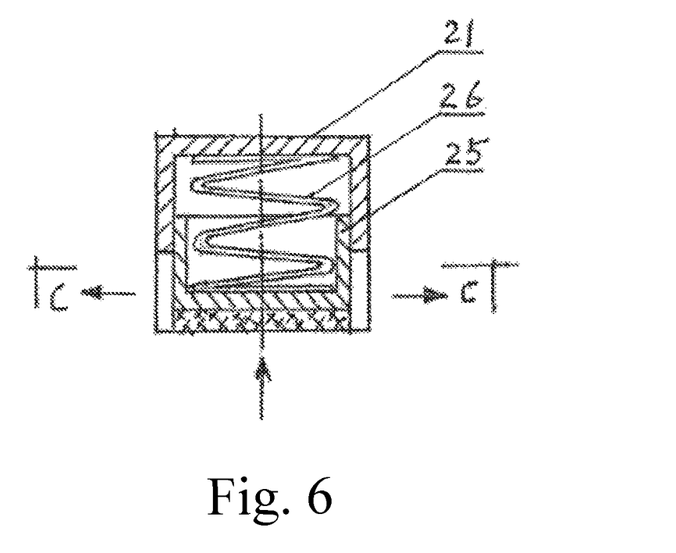
FIG. 6 is a forward sectional view of a water inflowing valve chamber 21.
Figure 7:
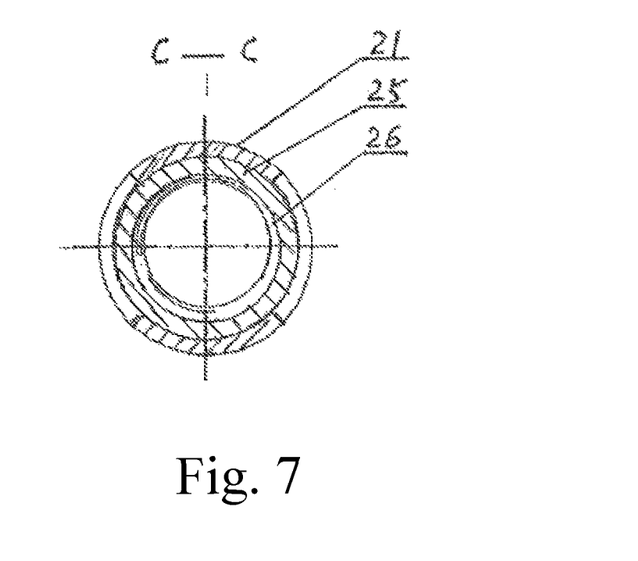
FIG. 7 is a C-directional view of the forward sectional view of the water inflowing valve chamber 21.
Figure 8:
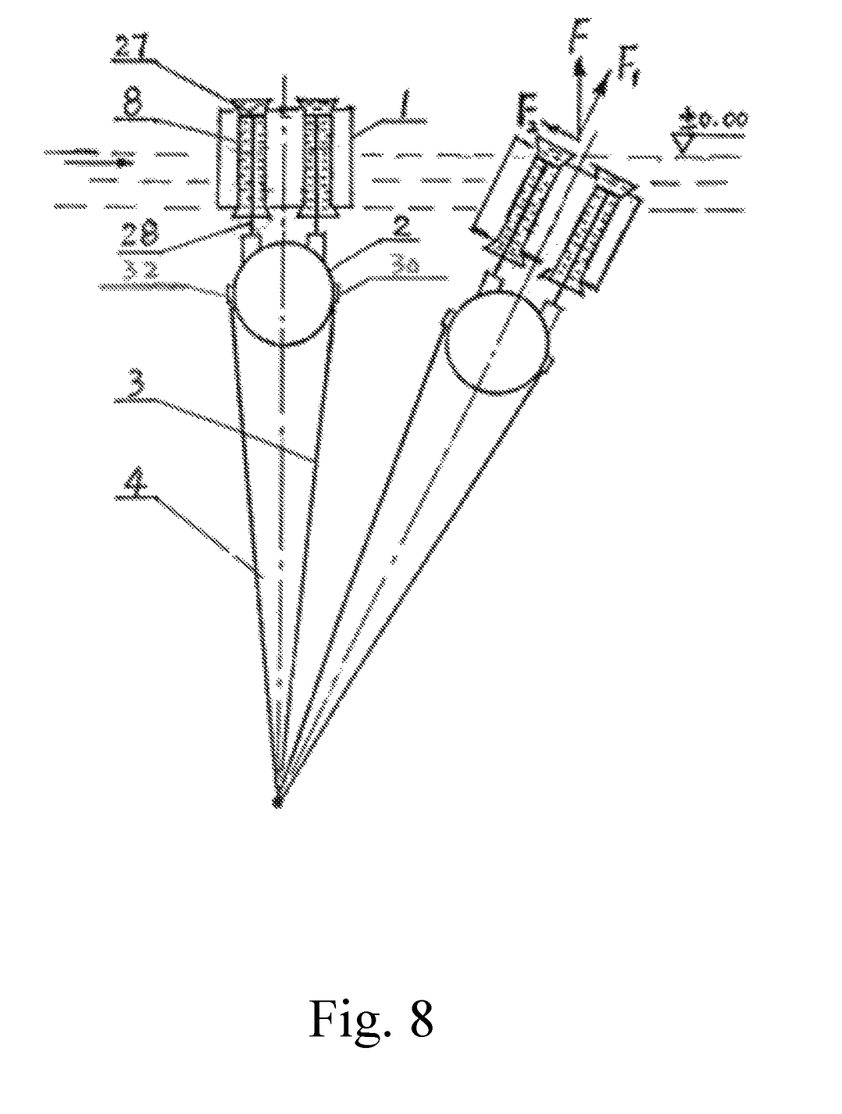
FIG. 8 is a schematic view showing that swaying waves do work.

Waves are the circular movement of water particles. Any point of the circular movement can be decomposed into two movement components respectively along the vertical direction and the horizontal direction. The vertical component is called as the vertical wave, which is capable of upraising objects in waves. The horizontal component is called as the swaying wave, which is capable of pushing and pulling objects and has high energy. When waves reach the device of the present invention, due to the lower floating body 2 and the piston rods 28 thereon are anchored, the vertical waves are only capable of upraising the upper floating body 1 and the hydraulic cylinders 8 fixed thereon, so that the piston heads 27 move relatively downwardly for pressurizing sea water under the piston heads 27; and simultaneously, the swaying waves are capable of tilting the upper floating body 1 and the lower floating body 2, due to a connection function of the piston rods 28 and a restriction function of the first cable 3 and the second cable 4, both the upper floating body 1 and the lower floating body 2 take the ball hinged hook 6 as a rotating axis for tilting at a same angle, so as to increase a draught of the upper floating body 1 for increasing a buoyancy thereof. The increased buoyancy is called as an additional buoyancy and is represented by F. A component F1 of F also upraises the upper floating body 1, as shown in FIG. 8. Therefore, under the combined action of the vertical waves and the swaying waves, the upper floating body 1 upraises upwardly, sea water under the piston heads 27 is pressurized, the water inflowing valve 25 within the water inflowing valve chamber 21 on the cylinder cover 14 is closed, the water discharging valve 23 within the water discharging valve chamber 18 is open, high-pressure water is discharged via the water discharging pipe 20 for doing work, and simultaneously the water discharging valve 23 within the water discharging valve chamber 18 on the cylinder cover 11 is closed under the action of the spring 24 for ensuring the air tightness of the hydraulic cylinders 8; under the action of externally atmospheric pressure, the water inflowing valve 25 within the water inflowing valve chamber 21 is open, sea water is sucked through the water inflowing pipe 22 to the cylinder body above the piston heads 27 for subsequent work.

Figure 9:
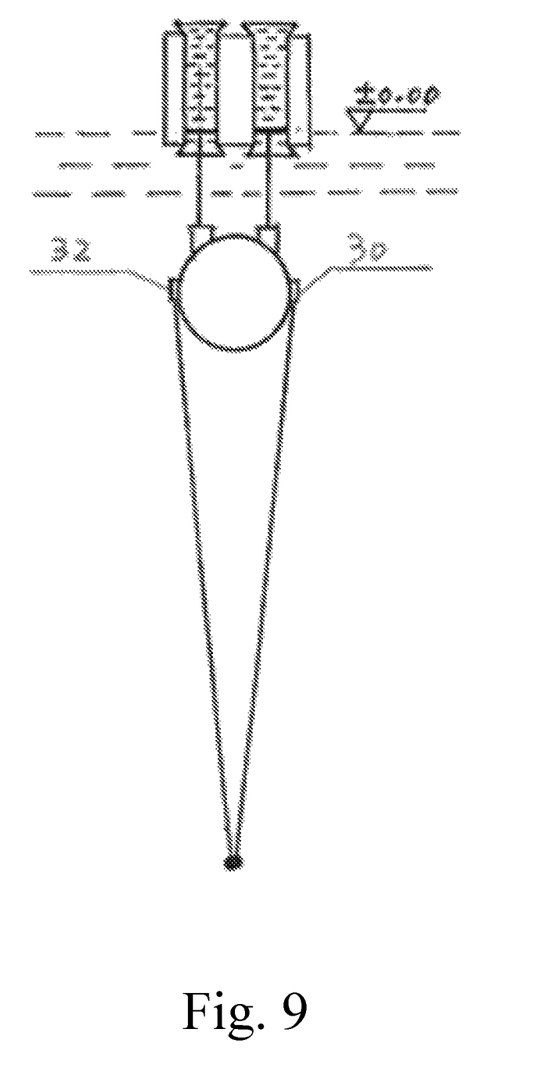
FIG. 9 is a schematic view showing that the gravity does work.

When waves pass through ½ period, upraising forces and pushing-and-pulling forces disappear, the lower floating body 2 returns back to a vertical position under the action of the horizontal buoyancy component thereof, and drives the upper floating body 1 to return back to the vertical position through the piston rods 28. During upraising action, the draught of the upper floating body 1 is decreased, namely, the upper floating body 1 has a potential energy, as shown in FIG. 9. Therefore, the upper floating body 1 falls back to the sea under the action of gravity; at this time, the pistons 27 are supported by the lower floating body 2 with enough buoyancy, so that the pistons 27 move relatively upwardly; similarly aforementioned, high-pressure water is discharged through the water discharging pipe 19 for doing work, and simultaneously, the water inlet 17 sucks the sea water into the cylinder body below the pistons 27 for subsequent work while next waves coming.

It can be known that during the former half period of waves, the present invention converts a part of the wave energy into the high-pressure water energy for outputting, and converts another part of the wave energy into the potential energy of the upper floating body 1 for storing. Due to a proportion of the upper floating body is 0.5, the two energies are the same. However, during the latter half period the waves, the stored potential energy is converted into high-pressure water energy for outputting, and the conversion process is synchronous with waves, thus the present invention is capable of continuously outputting the high-pressure water energy. High-pressure water is conducted into the pelton turbine-electric generator set through the flexible pressure pipe for generating electricity. The pelton turbine-electric generator set is mounted on the platform or pontoon near the sea surface inside the device disclosed by the present invention. The electricity is the alternating current (AC) and is capable of being directly connected to the grid on the nearby coast.

When waves are smaller than the designed utilizing wave height, the pressure of high-pressure water is small, the electricity is small, but the electricity is still able to be continuously generated. When waves are higher than the designed utilizing wave height, the pistons 27 reach the lower end of the hydraulic cylinders 8 and are unable to move for doing work without exceeding ½ period, the output of high-pressure will be interrupted. The method of resolving the above problem is to properly add the length of the hydraulic cylinders 8 and the piston rods 28, so as to continuously do work while large waves appear.

Every hydraulic cylinder 8 is made of seamless steel tube, a cylinder sleeve made of titanium metal plate which is resistant from sea water corrosion, is located at an inner wall of the hydraulic cylinder 8.

The first cable 3 and the second cable 4 are able to be made of steel wires with high strength, are also able to be made of carbon fiber or aromatic polyamide fiber with higher strength and corrosion resistance, an armored protective layer is coated on the carbon fiber cable or aromatic polyamide fiber cable.

It also can be known that advantages of the present invention are as follows.

(1) By the multipoint mooring manner at two sides of the lower floating body 2, the lower floating body 2 is only able to swing through taking the ball hinged hook 6 as the rotating axis and is unable rotate itself, so that the upper floating body 1, the lower floating body 2, the first cable 3 and the second cable 4 are able to tilt at the same angle under the action of the swaying waves, so as to sufficiently utilize the energy of the swaying waves and synchronizing the action process of the upper floating body 2 with the waves.

(2) The plurality of hydraulic cylinders 8 vertically arranged at two sides of the upper floating body 1 and the piston rods 28 on the lower floating body 2 corresponding to the hydraulic cylinders 8 reliably connect the upper floating body 1 with the lower floating body 2, so that the upper floating body 1 is able to move freely under the harsh marine environment.

(3) Flared joints are respectively adopted at the upper end and the lower end of the hydraulic cylinders 8, so as to rationalize the arrangement of the water inlets and the water outlets for ensuring the free movement of water inflowing and discharging of the hydraulic cylinders 8.

(4) While action converting, namely, while the water outlet 12 or 16 stops discharging high-pressure water, the spring 24 and the water discharging value 23 ensure the air tightness of the cylinder for allowing the hydraulic cylinders 8 to full of water; while the water inlet 13 or 17 stops inflowing water, the spring 26 and the water inflowing valve 25 ensure the water tightness of the cylinder for allowing high-pressure water not to be leaked out, thus the hydraulic cylinders 8 are able to effectively work.

Furthermore, the present invention has low manufacturing cost, simple maintenance, high wave energy conversion rate and other advantages.

The present invention is able to be mounted near the coast to provide electricity for coastal cities, and is also able to provide electricity for inland cities after increasing the pressure.

The present invention is also able to be mounted near islands away from the mainland to provide electricity for sea islands which are lack of energy and have difficulties in laying power cables.

In the drawings, 1—upper floating body; 2—lower floating body; 3—first cable; 4—second cable; 5—hanging rod; 6—ball hinged hook; 7—sea floor anchor pile; 8—hydraulic cylinder; 9, 10—flared joint; 11—cylinder cover; 12—water outlet; 13—water inlet; 14—cylinder cover; 15—bearing; 16—water outlet; 17—water inlet; 18—water discharging valve chamber; 19, 20—water discharging pipe; 21—water inflowing valve chamber; 22—water inflowing pipe; 23—water inflowing valve; 24—spring; 25—water inflowing valve; 26—spring; 27—pistion head; 28—pistion rod; 29—pistion rod seat; 30, 31—first pair of earrings; 32, 33—second pair of earrings.

DETAILED DESCRIPTION OF THE PREFERRED EMBODIMENT

A hydraulic wave energy converter is disclosed. A height of an upper floating body is 3 M, a thickness thereof is 4 M, and a width thereof is 12 M. The upper floating body is a hollow steel reinforced concrete building. Three cylindrical hydraulic cylinders are vertically mounted at two sides of the upper floating body. A height of every hydraulic cylinder is 3 M, and an inner diameter thereof is 300 mm. The hydraulic cylinder is made of seamless steel tube with a thickness of 5 mm. A titanium metal sleeve, with a thickness of 1 mm, is attached to an inner wall of the hydraulic cylinder. A total weight of the upper floating body and the hydraulic cylinders is 72 T, and a proportion thereof is 0.5. Six hydraulic cylinders are connected with the lower floating body by piston rods, each of which having a diameter of 40 mm. The lower floating body is made of steel plate with a thickness of 4 mm, a diameter of 3.2 M and a length of 12 M. Six piston rod seats whose positions are corresponding to piston rods. Four earrings are respectively located at two sides of the lower floating body for fixing the cables. A total weight of the lower floating body is 10 T to providing a buoyancy of 86.5 T.

In the dock, the preset upper floating body and the lower floating body are assembled together, sea water is injected into the lower floating body for allowing a proportion thereof to be slightly larger than one, and then the assembly of the upper floating body and the lower floating body is hauled by tugs to the pre-empty sea; and then the lower floating body is connected with the pre-buried sea floor anchor pile through anchored cables made of aromatic polyamide fibers; and then sea water within the lower floating body is drawn out for recovering the buoyancy of the lower floating body, the length of the cables is adjusted to locate the pistons at the upper end of the cylinder body of the hydraulic cylinders, namely, near the upper cover, such that the action distance is the longest, and lengths of the cables at two sides of the hanging rod are same, so as to ensure that the upper floating body and the lower floating body are at the horizontal position. At this time, the upper floating body semi-floats on the sea surface, the lower portion of the upper floating body nearby is horizontally anchored with the lower floating body. Accordingly, the hydraulic wave energy converter completes the installation. The maximum effective wave height of the converter is 3 M, which is equivalent to the actual wave height 4.2 M. While the effective wave height is 1.5 M and the wave period is 6 S, the maximum pressure the outputted high-pressure water is 1.7 MPa and an average output power is 800 KW.

What is claimed is:

1. A hydraulic wave energy converter, comprising:
an upper floating body (1), a lower floating body (2), a first cable (3), a second cable (4), a hanging rod (5), a ball hinged hook (6) and a sea floor anchor pile (7),
wherein the upper floating body (1) is a rectangular hollow concrete building, at least two hydraulic cylinders (8) are respectively vertically and equidistantly fixed to two wider sides of the upper floating body (1), a flared joint (9) is fixed to an upper end of every hydraulic cylinder (8), a flared joint (10) is fixed to a lower end of every hydraulic cylinder (8), a cylinder cover (11) is located at a wider end of the flared joint (9), a water outlet (12) is provided at a middle of the cylinder cover (11), two water inlets (13) are respectively provided at two sides of the cylinder cover (11), a cylinder cover (14) is located at a wider end of the flared joint (10), a bearing (15) is mounted in a circular hole at a middle of the cylinder cover (14), a water outlet (16) and two water inlets (17) are respectively provided at a periphery of the cylinder cover (14), the water outlet (12) is connected with a water discharging valve chamber (18) and a water discharging pipe (19), the water outlet (16) is connected with the water discharging valve chamber (18) and a water discharging pipe (20), both the two water inlets (13) and the two water inlets (17) are connected with a water inflowing valve chamber (21) and a water inflowing pipe (22), a water discharging valve (23) and a spring (24) are located within the water discharging valve chamber (18), a water inflowing valve (25) and a spring (26) are located within the water inflowing valve chamber (21), a piston head (27) slidably fitted with a cylinder wall and a piston rod (28) connected with the piston head (27) are located within every hydraulic cylinder (8), a proportion of the upper floating body (1) with every hydraulic cylinder (8) is 0.5, the lower floating body (2) is a sealing cylindrical housing, a piston rod seat (29) is located at an upper portion of the lower floating body (2), an amount and a position of the piston rod seat (29) are corresponding to those of the piston rod (28), a first pair of earrings (30) and (31) are located at one side of the lower floating body (2), a second pair of earrings (32) and (33) are located at the other side of the lower floating body (2), the first cable (3) is fixedly connected with the first pair of earrings (30) and (31) via the hanging rod (5), the second cable (4) is fixedly connected with the second pair of earrings (32) and (33) via the hanging rod (5), the hanging rod (5) is connected with the sea floor anchor pile (7) via the ball hinged hook (6).

2. The hydraulic wave energy converter, as recited in claim 1, wherein every hydraulic cylinder (8) is made of seamless steel tube, and a cylinder sleeve made of titanium metal plate which is resistant from sea water corrosion, is located at an inner wall of the hydraulic cylinder (8).

3. The hydraulic wave energy converter, as recited in claim 1, wherein the first cable (3) and the second cable (4) are made of steel wires with high strength, or carbon fiber or aromatic polyamide fiber with higher strength and corrosion resistance, an armored protective layer is coated on the carbon fiber cable or aromatic polyamide fiber cables.

\* \* \* \* \*